Feb. 5, 1963  C. P. McHUGH  3,076,736
BELT SPLICING
Filed April 29, 1960  2 Sheets-Sheet 1
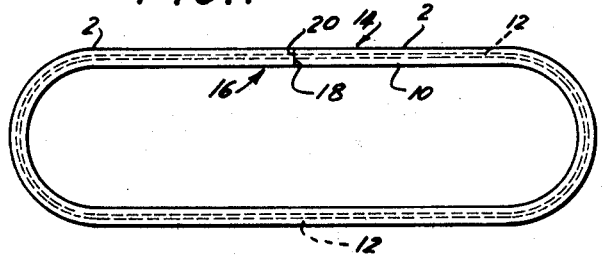
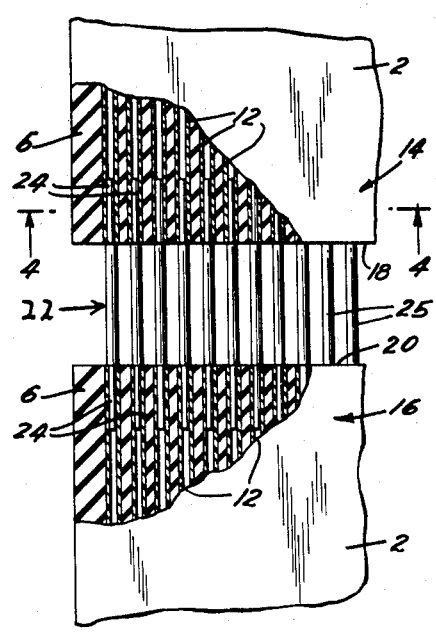
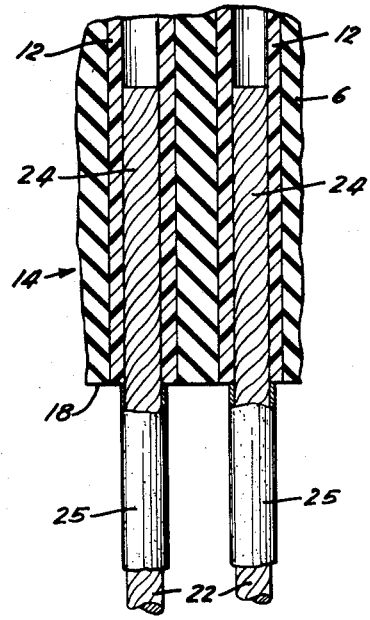
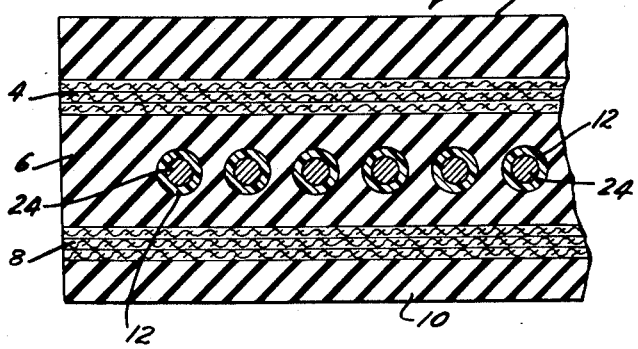
INVENTOR.
CHARLES P. McHUGH
BY
*James and Franklin*
ATTORNEYS Feb. 5, 1963  C. P. McHUGH  3,076,736
BELT SPLICING Filed April 29, 1960   2 Sheets-Sheet 2

INVENTOR.
CHARLES P. McHUGH
BY
James and Franklin
ATTORNEYS

United States Patent Office 3,076,736
Patented Feb. 5, 1963

3,076,736
BELT SPLICING
Charles P. McHugh, Ridgewood, N.J., assignor to Raybestos-Manhattan, Inc., Passaic, N.J., a corporation of New Jersey
Filed Apr. 29, 1960, Ser. No. 25,696
4 Claims. (Cl. 154—52.1)

The present invention relates to method and means for splicing together belt ends. The invention is applicable to all types of belts, but has special value, and is here specifically disclosed, in connection with laminated rubber belting of the type customarily used in endless transmission belts, conveyor belts, V-belts and the like.

The problem of belt splicing is almost inescapable, particularly in industrial applications. Endless belts, such as are used for transmission or conveyor purposes, are usually formed from a single length of belting cut to desired length, the ends of the length of belting being then spliced to one another to initially form the endless belt. For small size belts it is possible in some instances to form integral continuous belts, but splicing is necessarily involved in repair of all types of belts, whether integrally formed or initially spliced, and whether endless or not.

The slice has in the past been the weakest part of the belt. Many procedures and structures, some of them involving quite complicated manipulative steps, have been proposed to produce a splice of maximum strength, and some of these procedures have been used quite widely in industry. One method which has been used very extensively in connection with laminated rubber belting is to carefully cut away the rubber and fabric at the ends of such belting in matching steps, mate the steps at the two ends of the belt, and then vulcanize the belt ends to one another. This procedure has many drawbacks apart from its time-consuming nature. One cannot be sure that all of the steps at the ends of the belt fit snugly against one another because when the two ends are mated the inner steps are covered and only the outer steps are visible along their entire length. It is very difficult to cut away and separate from the rubber layers of the belt the plies of strength members, usually formed of fabric or cord, that make up part of the belt carcass, since the adhesion of the rubber to the fabric or cord is very strong and the slightest cut in the fabric or cord weakens it considerably. When the belt is large even the vulcanization step presents a real problem—the vulcanizer used on a large belt may itself weigh over a ton. Even when this splicing procedure is carried out with great care and skill, the splice remains the weakest part of the belt and limits the load on the belt. Despite these disadvantages, this and other similarly complicated procedures nevertheless have been widely employed because the splice produced thereby, although weaker than the belt itself, was considered to be the best that could be obtained.

In accordance with the present invention, however, a splice can be produced simply and expeditiously and without having to use complicated or expensive equipment, and the finished splice is eminently superior to those produced by prior art procedures. Indeed, it is even stronger than the body of the belt and therefore does not limit the load which may be placed on the belt. Moreover, that portion of the belt structure which is used in achieving this novel splice itself adds appreciably to the longitudinal strength of the entire belt body.

In accordance with the present invention the belt body is formed with a plurality of longitudinally extending tubular elements which constitute longitudinal strength members for the belt. These elements may be secured to the belt in any way, and are preferably embedded therein, together with conventional strength members if desired. These tubular elements extend to and are exposed at the belt ends which are to be spliced to one another. Auxiliary elements are inserted into the exposed ends of those tubular elements so as to extend from one belt end to the other, and are secured to the tubular elements in which they are received, as by the use of an appropriate adhesive with which the auxiliary elements are coated. When the adhesive is set, or the auxiliary elements are otherwise secured in place, a splice is produced the strength of which is determined by the bonding action of the adhesive and the tensile strength of the auxiliary elements themselves. The auxiliary elements may be formed of exceedingly strong materials such as braided steel cable, and heat-settable adhesives such as epoxy resins are available which will form extremely strong bonds between the auxiliary elements and the tubular elements. As a result splices are produced having exceptional strength.

Since discontinuities in the belt are generally undesirable, the belt ends to be spliced are, after the auxiliarly elements have been partially inserted into the exposed tubular elements at opposed ends of the belts, drawn toward one another into abutting engagement, the auxiliary elements then become completely telescoped into their respective tubular elements, and the abutting ends of the belt body proper may be secured to one another by an appropriate adhesive if desired, thus making for a neat and permanent butt joint. A suitable low-temperature-curing insert of dough or uncured rubber could also be used. While vulcanization of the belt, when the belt is formed of rubber, may optionally be carried out, it is significant that vulcanization is by no means necessary in connection with the instant invention, thus greatly simplifying the operations involved and eliminating the need for expensive equipment. It is further noteworthy that the ends of the belt to be spliced require no special preparation or manipulation other than a simple straight cut which may be made with a knife or cutting wheel.

To the accomplishment of the above, and to such other objects as may hereinafter appear, the present invention relates to belt structure and to a method of forming a splice in a belt, as defined in the appended claims, and as described in this specification, taken together with the accompanying drawings, in which:

FIG. 1 is a side elevational view of an endless belt formed from a length of belting the ends of which have been spliced in accordance with the present invention;

FIG. 2 is a top plan view, partially broken away and cross sectioned, illustrating a preliminary step in the attainment of the belt splice of the present invention;

FIG. 3 is a fragmentary view, on an enlarged scale, of a portion of the assembly shown in FIG. 2;

FIG. 4 is a cross sectional view on an enlarged scale taken along the line 4—4 of FIG. 2;

Figure 5:
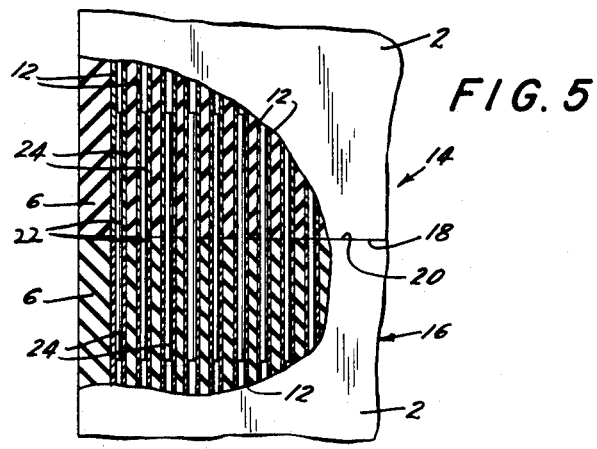
FIG. 5 is a view similar to FIG. 2 but showing the belt after the splice has been completely effectuated.

The invention is here specifically disclosed by way of exemplification in a rubber belt such as is used for conveyor or transmission purposes. The term "rubber" includes both natural and synthetic rubbers and rubber substitutes. As is conventional, and is here schematically disclosed (see FIG. 4), such a belt may comprise an upper rubber layer 2, a layer 4 of strength members such as fabric or cord which extend laterally of the belt to impart lateral strength thereto and which may also extend longitudinally of the belt to impart longitudinal strength thereto (and which layer may itself be of multi-ply construction), a central rubber layer 6, another layer 8 of strength members, and a bottom rubber layer 10. In accordance with the present invention, there is added to this typical and essentially conventional structure a plurality of longitudinally extending flexible tubular elements 12, preferably embedded in the central rubber layer 6 and located between the conventional strength layers 4 and 8. These tubular elements 12 are formed of any appropriate material which is sufficiently flexible so as not to unduly inhibit the flexibility of the belt and which can be secured in non-slipping relation to the remainder of the belt body. Preferably the tubular elements 12 are also of sufficient tensile strength so as to contribute appreciably to the overall longitudinal tensile strength of the assembled belt, thereby themselves constituting longitudinal strength members. Nylon is a highly satisfactory material for the tubular elements 12. Another synthetic resin which is satisfastory is that sold under the trade name "Delrin" by E. I. du Pont de Nemours & Co. Inc., and which is believed to be a resin of the acetal type. Tubular elements 12 formed of flexible steel could also be employed.

The belt has ends generally designated 14 and 16 which are adapted to be spliced together. These ends have end surfaces 18 and 20 respectively, which may be formed from simple straight cuts through the body of the belt. The tubular elements 12 extend to and are exposed at the end surfaces 18 and 20. In order to effectuate a splice the two belt ends 14 and 16 are lined up and supported with their respective end surfaces 18 and 20 spaced from one another a short distance, such as approximately two inches. Auxiliary elements 22, of a size and shape such as to be received within the tubular elements 12, and preferably rather snugly received therewithin, are then arranged between the belt ends 14 and 16, the extremities 24 of each of the auxiliary elements 22 being telescoped into an opposed pair of ends of the tubular elements 12 in the belt ends 14 and 16 respectively, the central portions of these auxiliary elements 22 being exposed between the belt end surfaces 18 and 20, as may clearly be seen in FIG. 2. These auxiliary elements 22 are formed of any suitable material which may be bonded to the interior of the tubular elements 12 and which has appreciable tensile strength. They should also preferably be flexible so as not to inhibit flexibility of the belt at the spliced area thereof. Steel cable or wire has been found to be exceptionally advantageous for the auxiliary elements 22, but they could also be formed of natural or synthetic fibres, preferably appropriately twisted or woven together to add strength thereto and coated with resin. Alternatively, thin plastic rods of nylon or the like could be employed for this purpose.

With the parts in the position shown in FIG. 2, the intermediate portions of the auxiliary elements 22 exposed between the belt end surfaces 18 and 20 are liberally coated with a suitable adhesive 25 (see FIG. 3) which will provide adequate bonding to the interior of the tubular elements 12. Commercially available epoxy resin adhesives have been found to be quite effective for this purpose, whether the auxiliary elements 22 are formed of metal or fibre and whether the tubular elements 12 are formed of plastic or steel. It will be understood that the adhesive 25 may be applied to the entire length of the auxiliary elements 22 before their extremities 24 are initially inserted into the tubular elements 12, but the application of the adhesive only to the intermediate portions of the auxiliary elements 22 is preferred because that facilitates the initial insertion of the auxiliary element extremities 24 within the tubular elements 12.

The belt end surfaces 18 and 20 may, if desired, be coated with an appropriate cement, such as any of the self-curing rubber cements commercially available, this being preferred in order to prevent even minute discontinuities at the spliced area, but the use of cement for this purpose is not essential to the instant invention.

Next the belt ends 14 and 16 are drawn toward one another, preferably until the end surfaces 18 and 20 abut one another. When this is done the adhesive-carrying lengths of the auxiliary elements 22 will telescope into the tubular elements 12 in the two belt ends 14 and 16 (see FIG. 5).

With the belt ends 14 and 16 held so that their end surfaces 18 and 20 are pressed against one another, the adhesive is caused to set. Where heat is necessary or desirable for that purpose, the belt is heated in the area of the splice. This operation, it will be appreciated, even when involving the use of heat, is not nearly as time consuming or complicated as the vulcanization step which has normally been required in the procedures of the prior art, nor does it entail the use of such complicated or expensive equipment as vulcanization requires.

After the belt has been permitted to cool the splicing operation is complete and the belt is ready for use.

Figure 6:
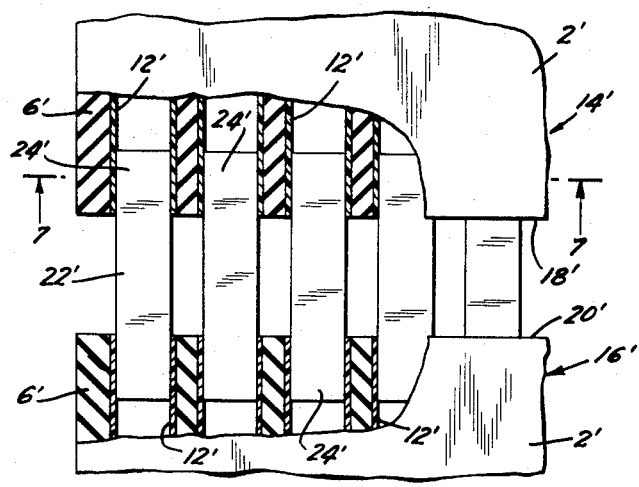
FIG. 6 is a view similar to FIG. 2 but showing a specifically different embodiment.
Figure 7:
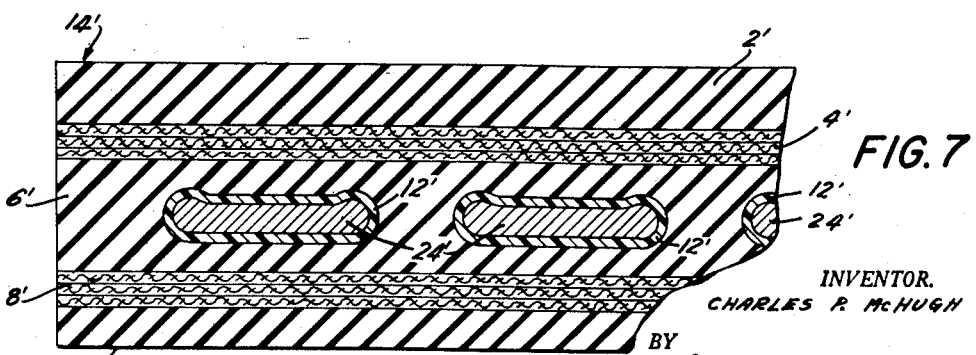
FIG. 7 is a cross sectional view on an enlarged scale taken along the line 7—7 of FIG. 6.

The embodiment of FIGS. 6 and 7 is essentially similar to that of FIGS. 2–5, and similar reference numerals are used to designate comparable parts, being differentiated, however, by being primed. The only significant difference between the embodiment of FIGS. 6 and 7 and the previously described embodiment is that the tubular elements 12' have an essentially flattened shape, and the auxiliary elements 22' are correspondingly shaped and hence in the form of ribbons or strips rather than rods.

While adhesive bonding of the auxiliary elements 22 to the tubular elements 12 has been here specifically disclosed and is preferred, other methods of connection between those two sets of parts could be employed. Thus, after the auxiliary elements 22 have been fully telescoped within the tubular elements 12, the tubular elements 12 could be crimped or otherwise deformed in order to retain the auxiliary elements 22 longitudinally in place or, particularly with the laterally elongated tubular elements 12' of the embodiment of FIGS. 6 and 7, nail-like elements could be driven through the belt from top to bottom, passing through the tubular elements 12' and the auxiliary elements 22' and preventing relative movement of one with respect to the other.

When the end surfaces 18 and 20 of the belt 14 and 16 do not accurately mate, or if desired for other reasons, a ply of uncured rubber could be inserted between the belt end surfaces 18 and 20, that ply thereafter being vulcanized to the belt ends 14 and 16 in order to fill up any irregularities between the surfaces 18 and 20.

From the above it will be apparent that the structure and method of the present invention is exceptionally meritorious. The tubular elements 12 which are used to produce the splice function as longitudinal strength members in the belt, and therefore play an important and useful role quite apart from their splicing function. The splice itself may be formed most simply, requiring only a simple straight cut of the belt, without any of the step-like cuts and layer-separations which characterize the most widely used prior art methods, and the various manipulative steps are such as may be readily carried out in a foolproof manner even by unskilled personnel. The result is a neat splice which, by reason of the tensile strength of the auxiliary elements 22 and the exceptionally strong bond between them and the tubular elements 12 within which they are received, make the spliced area of the belt even stronger than the belt body proper. And this, it will be noted, is accomplished without the necessity for vulcanization, thus making the splicing structure and method applicable for use in belts other than rubber belts.

While but a limited number of embodiments of the present invention have been here specifically disclosed, and while the disclosure has been in terms of a typical composite rubber and fibre belt construction, it will be apparent that many variations may be made therein, all coming within the scope of the invention as defined in the following claims.

I claim:

1. In a belt comprising a substantially freely flexible elongated body comprising rubber material with strength members embedded therein, the improvement which comprises said strength members comprising a substantially freely flexible tubular element independent of said body and secured to said body so as to extend longitudinally of said body for substantially the full length thereof with layers of other strength members positioned thereabove and therebelow, said tubular element having a substantially smooth inner surface and being adapted to be exposed at opposed ends of said belt, and, in a combination therewith, a substantially freely flexible auxiliary element freely slidable into and received within said exposed tubular element ends and extending between said opposed belt ends when said ends are spliced to one another, said auxiliary element being fixedly secured to the interior of said tubular element ends, said tubular element ends terminating at points substantially within the length of said body, thereby to be in non-overlapping relation when said belt ends are spliced to one another.

2. In a belt comprising a substantially freely flexible elongated body comprising rubber material with strength members embedded therein, the improvement which comprises said strength members comprising a plurality of substantially freely flexible tubular elements independent of said body and secured to said body so as to extend longitudinally of said body for substantially the full length thereof and spaced from one another, said tubular elements having a substantially smooth inner surface and being adapted to be exposed at opposed ends of said belt, and, in combination therewith, substantially freely flexible auxiliary elements freely slidable into and received within and extending between the opposed sets of tubular element ends and extending between said opposed belt ends when said ends are spliced to one another, said auxiliary elements being adhesively fixedly secured to the interiors of the tubular element ends within which they are received.

3. A spliced belt comprising two substantially freely flexible belt sections, each comprising rubber material with strength members embedded therein, said sections having opposed end surfaces, said strength members comprising a plurality of substantially freely flexible tubular elements independent of said body and secured to said body so as to extend longitudinally relative to said sections for substantially the full length thereof up to said end surfaces thereof and there having their open ends exposed, said tubular elements being laterally spaced from one another and having substantially smooth inner surfaces, and substantially freely flexible auxiliary elements each freely slidable into and received within and fixedly secured to said inner surface of tubular elements on one and the other of said belt sections respectively, thereby to splice said belt sections together, said tubular element ends terminating at points substantially within the length of said body, thereby to be in non-overlapping relation when said belt ends are spliced to one another.

4. A spliced belt comprising two substantially freely flexible belt sections each comprising rubber material with strength members embedded therein, said sections having opposed end surfaces, said strength members comprising a plurality of substantially freely flexible tubular elements located between upper and lower layers of other strength members, said tubular elements being independent of said body and extending longitudinally relative to said sections for substantially the full length thereof and up to said end surfaces thereof, and there having their open ends exposed to define opposed pairs of open-ended tubular elements, said tubular elements being laterally spaced from one another and having substantially smooth inner surfaces, and substantially freely flexible auxiliary elements each freely slidable into and received within and adhesively secured to said inner surfaces of an opposed pair of tubular elements, thereby to splice said belt sections together, said opposed end surfaces of said belt sections abutting and being adhesively secured to one another.

References Cited in the file of this patent

UNITED STATES PATENTS

| | | |
|---|---|---|
| 669,047 | Pratt | Feb. 26, 1901 |
| 1,371,513 | Nickerson | Mar. 15, 1921 |
| 2,001,835 | Cook | May 21, 1935 |
| 2,288,669 | Atkinson | July 7, 1942 |

FOREIGN PATENTS

| | | |
|---|---|---|
| 280,185 | Great Britain | May 3, 1928 |
| 456,539 | Great Britain | Nov. 11, 1936 |